(12) United States Patent
Robbins et al.

(10) Patent No.: US 6,879,251 B2
(45) Date of Patent: Apr. 12, 2005

(54) HAZARD LIGHT ACTUATION SYSTEM

(76) Inventors: William J. Robbins, P.O. Box 113, Lakeside, MT (US) 59922; Allan Solomon, 415 N. Martel Ave., Los Angeles, CA (US) 90036

(*) Notice: Subject to any disclaimer, the term of this patent is extended or adjusted under 35 U.S.C. 154(b) by 0 days.

(21) Appl. No.: 10/248,872

(22) Filed: Feb. 26, 2003

(65) Prior Publication Data
US 2003/0201886 A1 Oct. 30, 2003

Related U.S. Application Data
(60) Provisional application No. 60/375,948, filed on Apr. 26, 2002.

(51) Int. Cl.[7] ............................................. B60Q 1/52
(52) U.S. Cl. ...................... 340/471; 340/458; 340/472; 340/479
(58) Field of Search ................................. 340/458, 463, 340/472, 475, 479, 471, 478, 435, 436, 437, 903, 467; 307/10.1, 10.8

(56) References Cited

U.S. PATENT DOCUMENTS

| | | | |
|---|---|---|---|
| 3,492,638 A | 1/1970 | Lane | 340/464 |
| 5,327,990 A | 7/1994 | Busquets | 180/271 |
| 5,642,094 A | 6/1997 | Marcella | 340/479 |
| 5,775,712 A | 7/1998 | Link et al. | 280/422 |
| 5,815,073 A * | 9/1998 | Gomez et al. | 340/471 |
| 5,859,479 A * | 1/1999 | David | 307/10.8 |
| 6,076,026 A | 6/2000 | Jambhekar et al. | 701/35 |
| 6,100,799 A | 8/2000 | Fenk | 340/467 |
| 6,323,766 B1 * | 11/2001 | Bartlett et al. | 340/471 |
| 6,411,204 B1 * | 6/2002 | Bloomfield et al. | 340/467 |
| 6,424,256 B1 | 7/2002 | Ryder | 340/479 |

* cited by examiner

*Primary Examiner*—Davetta W. Goins
(74) *Attorney, Agent, or Firm*—Kyle W. Rost

(57) ABSTRACT

An electrical input signal from a vehicle's safety system actuates an electronic switch to close a by-pass circuit that circumvents a manual control for hazard lights. As a result, the hazard lights are automatically activated in response to the input signal upon actuation from the safety system and without manual intervention.

15 Claims, 5 Drawing Sheets

HAZARD LIGHT ACTUATION SYSTEM

CROSS REFERENCE TO RELATED APPLICATIONS

This application claims the priority benefit of U.S. Provisional Patent Application Ser. No. 60/375,948 filed Apr. 26, 2002, pending.

BACKGROUND OF INVENTION

1. Field of the Invention

The invention generally relates to electrical communications in land vehicles. More specifically, the invention relates to alarms or indicators, especially of collision or contact with external objects. The invention also relates to external light systems for hazard warning or distress signaling.

2. Description of Prior Art

Sensors on automobiles can detect and respond to special forces or collisions. One of the major safety systems on automobiles is the air bag deployment system. This system, or the seat belt retraction system, sometimes performs an additional function, such as notifying external services such as Tel-Aide or On-Star. Other force-responsive systems have been proposed to perform additional special functions. Following are examples:

U.S. Pat. No. 5,642,094 to Marcella teaches a multi-level response to a measured degree of braking, from light braking to panic braking. Panic braking, air bag deployment, front-end dip, or any other condition suggesting a panic event activates a large array of lights.

U.S. Pat. No. 5,775,712 to Link et al. teaches an automatic system for flashing the brake lights of a towed trailer if the normal power from the tow vehicle to the trailer is disrupted, such as if the trailer breaks away from the truck.

U.S. Pat. No. 5,327,990 to Busquets teach a post-crash safety management system that system opens door locks, shuts off fuel, releases seat belts, and rolls down windows.

U.S. Pat. No. 6,100,799 to Fenk teaches a system for actuating an array of brake lights on an automobile in response to a measured actuating event, such as a measured rate of deceleration or brake pedal force. A signal generator outputs a signal corresponding to the intensity of the actuating event. The output signal goes to a controller, which operates the array of brake lights. The controller selects the operation of the indicator according to the input signal from the signal generator.

With increasing input, the controller may cause the brake lights to increase in intensity, increase in size, or change positions.

U.S. Pat. No. 6,076,026 to Jambhekar et al. teaches an airplane-style black box that records automotive data from numerous sensors and automotive systems. This may be useful for police who investigate an accident.

U.S. Pat. No. 3,492,638 to Lane teaches a system of automatically controlled multiple signal lights to inform other drivers of the acceleration or deceleration of a vehicle.

U.S. Pat. No. 6,424,256 to Ryder proposes a sensor and special lighting system for responding to severe braking and flashing the lights as a warning. The disclosure notes that in addition to severe braking, the light system may be actuated if the air bag sensor senses a collision.

A difficulty with these many different proposed special lighting systems is that other drivers must comprehend the meaning. A driver witnessing a divergent variety of unique lighting schemes in operation ahead of his car may respond unpredictably or inappropriately. Therefore, it would be desirable to formulate an operating and control system that responds to an accident or emergency using widely understood signals.

It would be desirable to provide an automatic, permanent, or longer lasting warning of a dangerous condition or highway accident. Often the impact of an accident will stun the driver and passengers, perhaps placing them in a state of shock. Although these persons may have no serious injury, immediately after an accident they may think and perform on a sub-par level and neglect to take prudent safety steps. Drivers with diminished capacity, such as those under the influence of alcohol or other drugs, similarly may neglect safety steps. One area that is too often neglected is to actuate the hazard flashers on the car. Consequently, a system that automatically actuates hazard flashers would be beneficial.

Still more importantly, a car following behind a vehicle engaged in an accident may be unaware that the accident is in progress. For example, at night or in fog, a leading car may be in trouble without the problem being immediately evident to a following car. In this type of event, it would be a significant advantage for the hazard lights to automatically activate as early as possible in the event to warn other cars.

To achieve the foregoing and other objects and in accordance with the purpose of the present invention, as embodied and broadly described herein, the automatic hazard light activation of this invention may comprise the following

SUMMARY OF INVENTION

According to the invention, an apparatus for actuating a hazard light in a land vehicle responds to the signal from a safety system to actuate the light. The land vehicle may be any type having at least one safety system that generates an electrical signal in response to a detected condition, such as a hazard. The apparatus automatically actuates the hazard light in response to an electrical input signal generated within the vehicle's safety system. The hazard light is in an operating circuit including a manual switch and a first flash controller. The manual switch is positioned between the first flash controller and a current source. When in open position, the manual switch has a powered side in operative connection to the current source and a non-powered side in operative connection to the controller. The improved apparatus includes an electronic switch. A current source is electrically connected to the electronic switch. The electronic switch is arranged in a by-pass circuit with respect to the manual switch and is switchable between a first position opening the by-pass circuit and a second position closing the by-pass circuit. The by-pass circuit operatively connected for electrically activating the hazard light when the electronic switch is in second position. At least one input signal source from the vehicle's safety system selectively sends a signal to the electronic switch. The input signal source is selected from the group consisting of a signal triggering the deployment of an air bag, a signal triggering the deployment of a seat belt tensioning retractor system, a signal indicating rapid loss of tire pressure, a signal indicating a collision, or any combination of these. The electronic switch also includes a device for closing the bypass circuit in response to receiving the input signal. As a result, the hazard light is automatically activated in response to the input signal.

Another aspect of the invention is a method of automatically actuating a hazard light in response to an electrical input signal generated within a safety system of a land vehicle. The land vehicle is provided with (1) at least one safety system generating an electrical input signal in response to being triggered, and (2) an operating circuit containing a manual switch and a flash controller, in which the manual switch is electrically located between the flash controller and a current source, such that when the manual switch is in an open position it has a powered side in operative connection to the current source and a non-powered side in operative connection to the flash controller. The method is best practiced by, first, providing a by-pass circuit with respect to the manual switch, containing an electronic switch electrically connected to a current source and switchable between a first position opening the by-pass circuit and a second position closing the by-pass circuit and electrically activating a hazard light. Further, the vehicle's safety system is connected to the electronic switch for switching the electronic switch to the second position in response to an input signal from the safety system. Next, the safety system generates an electrical input signal in response to being triggered. The method transmits the input signal from the safety system to the electronic switch, thereby activating the hazard light in response to the input signal.

The accompanying drawings, which are incorporated in and form a part of the specification illustrate preferred embodiments of the present invention, and together with the description, serve to explain the principles of the invention. In the drawings:

DETAILED DESCRIPTION

Figure 1:
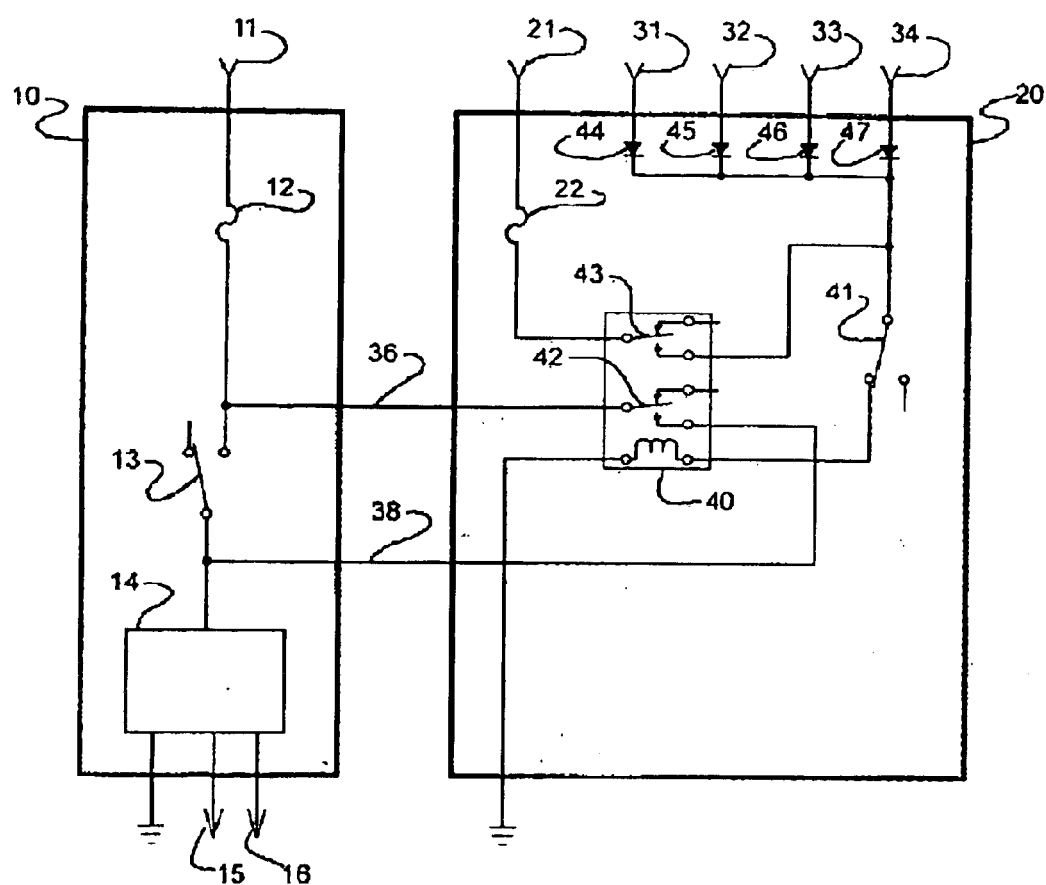
FIG. 1 is a schematic circuit diagram that incorporates the system of the invention.

The invention is an apparatus and method for automatically activating vehicle hazard lights in response to triggering a safety system. The safety system may be designed to detect and be triggered by a selected type of event. Land vehicles such as automobiles often are operated in crowded areas such as freeways and busy streets. Accidental impacts can occur between two vehicles and sometimes among a greater number of vehicles in close proximity. Other impacts occur between a single vehicle and another object in close proximity. Any substantial impact on a vehicle can exert a powerful jolt to the occupants, pitching them against fixed parts of the automobile and possibly inflicting serious injury.

Vehicles are required to be equipped with certain safety features to protect occupants. One such safety feature is an automatically activated air bag system, in which an air bag deploys when the system is triggered by a significant collision. The deployment system incorporates a sensor that detects conditions indicative of a significant impact. The sensor causes a signal to be generated in response to an impact. In turn, the signal causes the air bag to deploy. Another safety features is a seat belt tensioner. This device applies extra tension to a seat belt when an impact has been detected. The extra tension is intended to hold the occupant in place so as to minimize the chance of being thrown against a fixed part of the vehicle. A third safety feature detects low tire pressure or a tire blowout. These systems, as well as others, provide internal protection for a vehicle's occupants. However, the sensor systems can be adapted to protect those outside the vehicle, as well.

When a vehicle is involved in an accidental collision or like event that causes air bag deployment, hazard lights or emergency lighting will be activated electronically and immediately. The rapid actuation of these safety lights serves to ensure the safety of the vehicle's occupants against a compounding to the initial accident. In addition, the rapid actuation ensures the safety of other vehicles in proximity to the accident. Activating the hazard lights with either the deployment of air bags or retraction of seat belts can reduce the chance of a chain-reaction accident, involving additional vehicles approaching the site of an accident. Thus, the automatic activation of hazard lights would reduce the chance that an approaching vehicle would become involved in an existing accident and would protect those already involved from further injury.

Automatically activated hazard lights provide early warning that the victims of an accident often fail to initiate manually. Some people who are involved in an accident do not think about turning on their hazard lights immediately. Others may not have time to do so before leaving their vehicle or before a chain reaction accident begins. Still others are unable to turn on their hazard lights because of their injuries, loss of consciousness, or even death. When in heavy traffic, immediate activation of warning lights is highly important to avoiding a follow-up chain reaction accident.

The hazard light actuation system can share existing or future sensors that actuate a vehicle safety system by anticipating or responding to a vehicle collision or other dangerous condition. For example, the vehicle's sensors for activating the vehicle's air bags can be used for the additional purpose of actuating hazard lights. Air bag systems are known by various names or acronyms, including SRS and IRS, but all other air bag systems are also considered as candidates to share their sensors for the automatic and immediate deployment of hazard lights. Another method of activating hazard lights is by sharing a signal for deployment of a seat belt tensioning retractor system. One such system is known as ETR, but all other retractor-tensioning systems are also considered as candidates to share their sensors for the automatic deployment of hazard lights. Another new technology is designed to detect a tire blowout, and this also can actuate the hazard lights. While these three shared systems represent currently used safety systems, any other system that generates a signal associated with the occurrence or likely occurrence of an accident can be used in a shared capacity.

Currently, all vehicles use left and right turn signal indicators as hazard lights. The attached drawings illustrate that a series of automated switches can activate hazard lights electronically, with the assistance of the air bag triggering module, the seat belt tensioning triggering module, or another safety sensor. The hazard light activation system can be operated in the same manner in cooperation with other emergency systems, such as those known by trademarks Tel-Aide or On-Star, or any other system that incorporates this type of design by any other manufacturer. The automated Tel-Aide and On-Star systems are notified if and when the vehicle's air bags or seat belt retraction systems are activated. Such systems sense a voltage or current signal, which the invention now employs in a shared capacity to trigger a hazard light electronic switch.

Sharing of the sensor signal can be accomplished by locating an electronic switch in parallel with the manual hazard light switch that is typically located on the front driver and passenger dashboard. When the vehicle's air bags are deployed, or when the seat belt retraction system is deployed, the electronic switch by-passes the hazard light switch allowing the hazard lights to come on immediately.

FIG. 1 shows an apparatus and method for automatic switching on an existing hazard lights circuit of a vehicle. The system consists of an aggregate of mechanical and electrical elements connected to triggering devices. The block diagram 10 contains a representative current commercial design for controlling hazard lights. A voltage 11 is applied at all times, such as from the vehicle's battery. A fuse 12 between the voltage source and a hazard light switch 13, which has a steady state open, protects the circuit. When the switch is activated or closed, voltage is sent to a module 14, which contains a flasher and controls the turn signal lights to perform as hazard lights. When actuated, the module 14 sends alternating power surges to left turn signal lights 15 and right turn signal lights 16, causing them to flash in unison.

Block diagram 20 shows an electronic triggering system arranged as a by-pass circuit for a manual hazard light switch 13. The by-pass system is permanently wired in parallel to the hazard light switch 13. This system is in communication with one or more accident sensors or modules for sending a signal in response to an accident or impact, such as the sensors or system used to send a signal for triggering air bags.

An efficient triggering system may employ sensors already in place for another compatible purpose, such as sensor 31 for triggering deployment of an air bag, sensor 32 for actuating a seat belt retraction system, or sensor 34 for detecting a tire blow out. The triggering system may receive an actuating signal from any automated system or device on the vehicle, including the vehicle's central processing unit (CPU) 33, which may determine by programming or other suitable means that the vehicle has been involved an accident or that an accident appears imminent. The signal from a sensor or source 31, 32, 33, or 34 enables an electronic switch 40 to activate hazard lights. Diodes 44, 45, 46, and 47 serve to isolate the various input signal or voltage sources 31, 32, 33, and 34 from each other. Additional diodes may be employed to accommodate as many additional sources as a vehicle may supply.

Typically, the steady state condition of electronic switch 40 is open or off. When electronic switch 40 receives an activation signal, it is turned on and its condition is closed. When electronic switch 40 is turned on and, hence, electronically closed at contacts 42 and 43, hazard light switch 13 is by-passed or electronically closed, such as through contact 42 and leads 36, 38. Thus, the voltage from source 11 is enabled to reach flasher module 14, and this module sends alternating power surges to the left turn signal lights 15 and the right turn signal lights 16.

The electronic switch 40 can be an electrically operated double pole, double throw switch. Once activated even momentarily by any of the inputs 31, 32, 33, or 34, the switch closes contact 43, which supplies voltage from supply 21, keeping the electronic switch in the latched state after the sensor signal has terminated. As described above, the manual switch 13 has been by-passed and is inoperative to turn off the hazard lights. A manual hazard light reset switch 41 is located in the circuit established by leads 36, 38 to allow a reset of module 40 and to restore functionally to switch 13. Until reset by switch 41, the hazard lights will continue to flash. Hazard light reset switch 41 can be a single pole double throw switch that has a steady state of closed or turned-on. When the reset switch is triggered, it assumes an open state and disables or returns electronic switch 40 to the normally open condition, which opens the by-pass circuit through leads 36, 38, again allowing the manual hazard switch 13 to control whether the hazard lights are turned on or turned off. After the emergency condition has been rectified, the reset switch can be cycled off and then back on, which in the absence of any signal from inputs 31, 32, 33, or 34, again returns the system to the operating state wherein it waits for a triggering signal. If after the emergency signal has been rectified, one of the inputs 31, 32, 33, or 34 does not return to normal, then switch 41 can be left in the open or disable position until the vehicle's other emergency system can be serviced.

Figure 2:
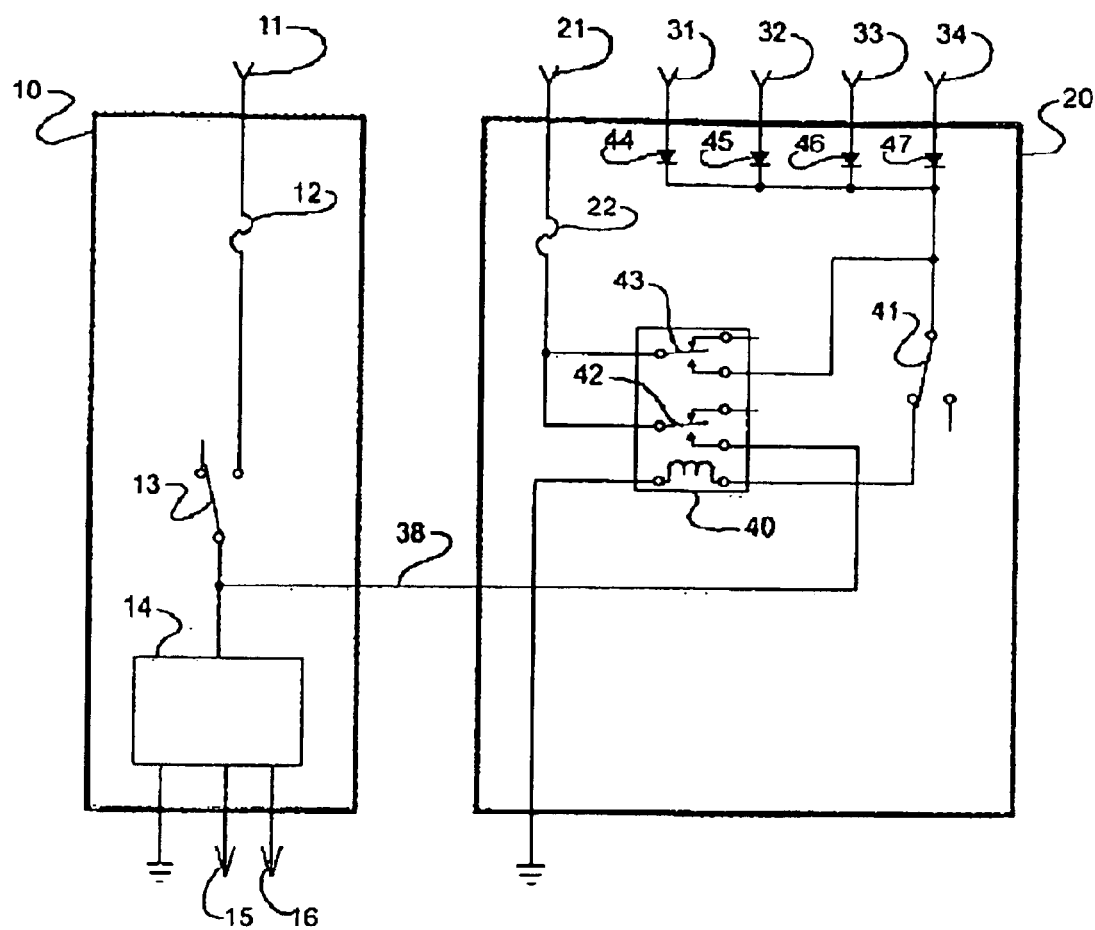
FIG. 2 is a schematic circuit diagram of an alternate embodiment of the invention.

FIG. 2 shows a variation in the method of interconnection to the vehicle's emergency flasher circuit. The FIG. 2 implementation operates with the same triggering logic as shown in FIG. 1. However, instead of simulating contact closure for switch 13, the circuit of FIG. 2 employs a permanent connection 38 to supply current directly to the vehicle's emergency flasher unit 14 through contact 42 from the supply 21.

Figure 3:
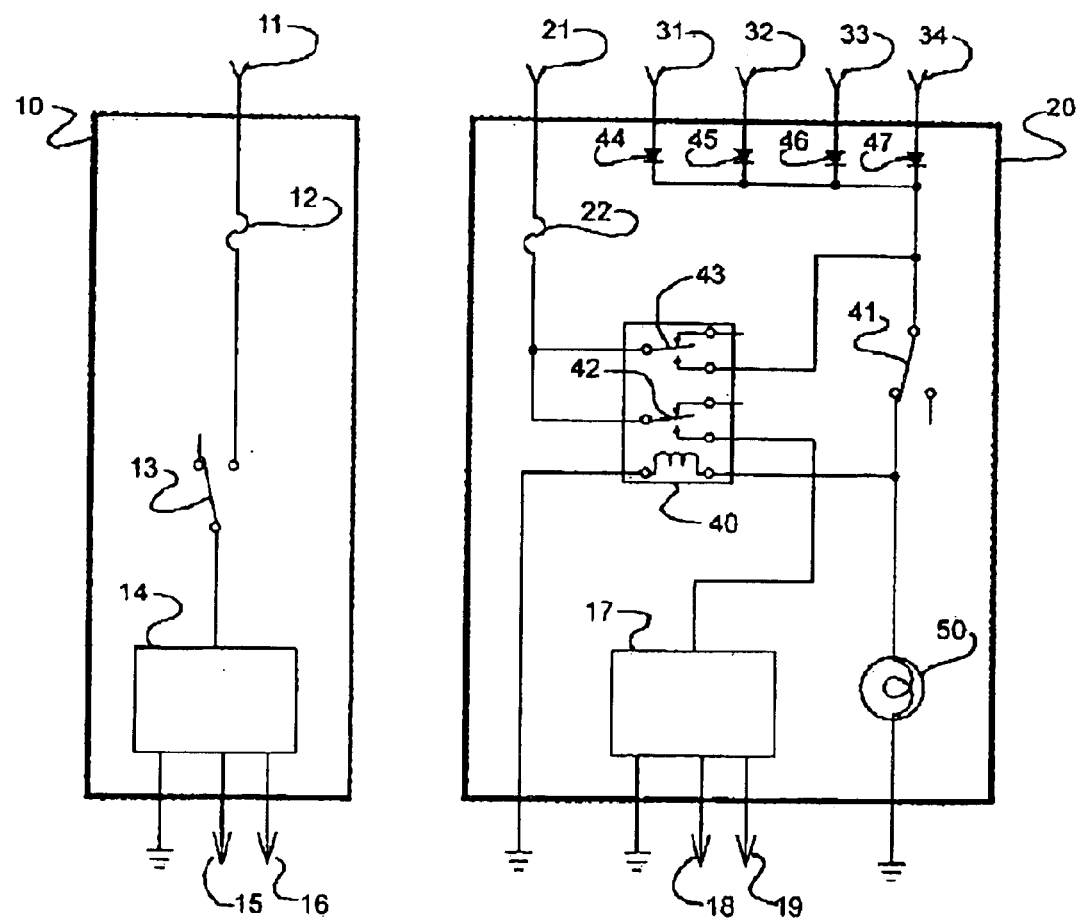
FIG. 3 is a schematic circuit diagram showing optional additional functions of the invention.

FIG. 3 shows an optional method for providing the pulsing current to operate emergency flashing lights. Using the same triggering logic described in association with FIGS. 1 and 2, above, current is supplied directly to a separate flashing module 17 contained within the circuitry of the invention. Separate flashing module 17 has an additional ability to operates lamps other than the normal turn signal light flashers. For example, module 17 can operate additional lamps, lamps of a different color, or strobe lamps at 18 and 19. These special or additional signaling lamps can be beneficial because they are not manually actuatable and will not be activated by occupants of the vehicle, whether in error or for a perceived reason. Only the automated system can trigger the special lights, and this is done primarily in response to an actual accident. Thus, if special lights are used, they can indicate a situation that is more dangerous than a mere threatened hazard.

FIG. 3 also shows an optional indicator lamp 50. This lamp is connected to switch 40 to be illuminated when switch 40 closes. Power supply 21 feeds lamp 50 through contacts 43 and hazard light reset switch 41. In order for lamp 50 to be lit, both switch 40 and switch 41 must be closed. Indicator lamp 50 can serve as a reminder that the hazard lights are operating. When the optional indicator lamp 50 is implemented in an identical manner into the implementations shown in FIGS. 1, 2 and 5, it can serve as an indication that the manual switch 13 is temporarily inoperative and that the lights are flashing.

Figure 4:
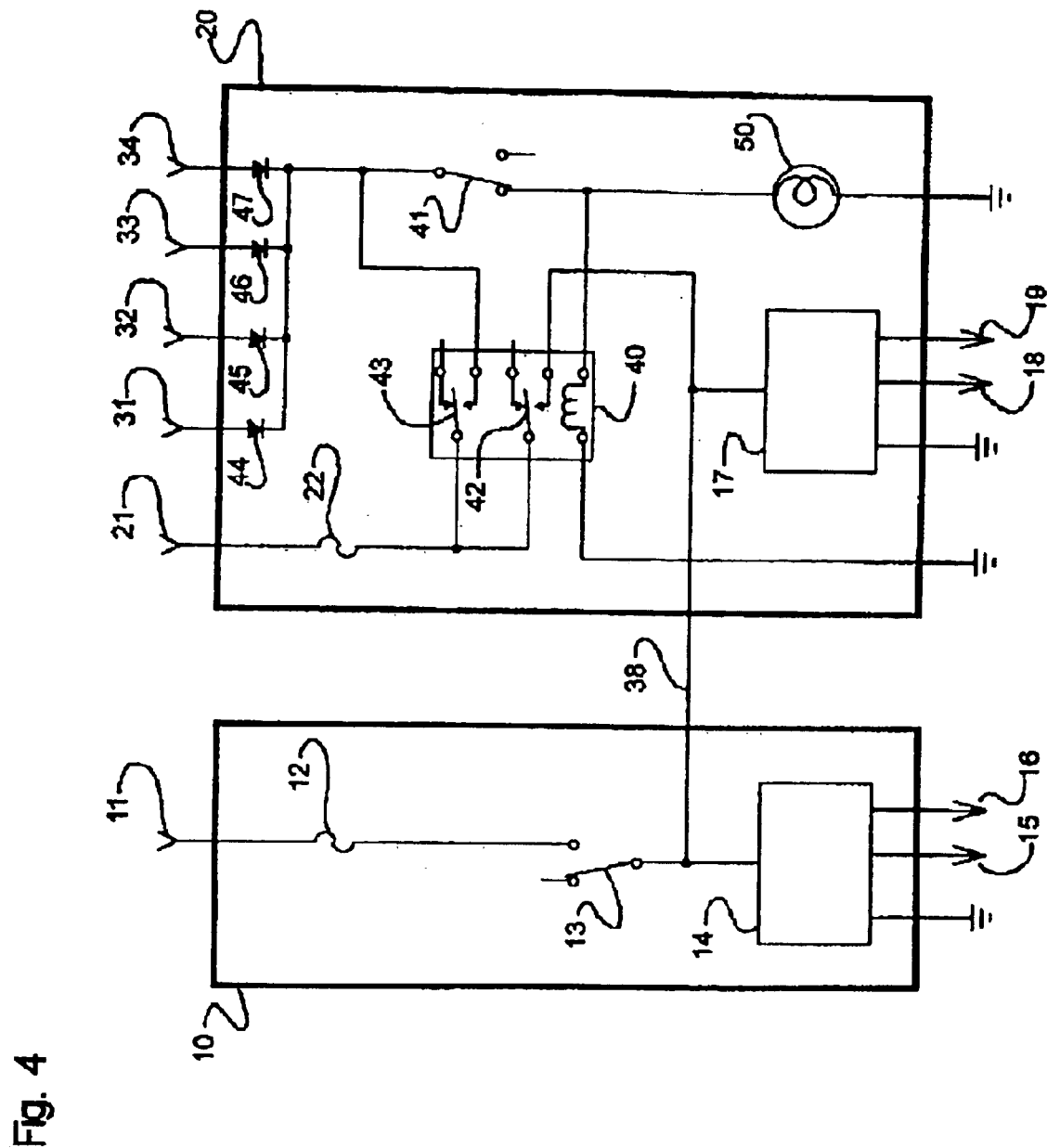
FIG. 4 is a schematic circuit diagram showing an embodiment similar to FIG. 2, with a modification similar to FIG. 3.

The embodiment of FIG. 4 provides a variation of FIG. 2. A voltage source 21 is connected through permanent connection 38 to the vehicle's emergency flasher unit 14. Switch 42 selectively closes the circuit supplying current to flasher unit 14, supplying alternating power surges to a left turn signal light 15 and a right turn signal light 16. As in FIG. 3, the embodiment of FIG. 4 includes a separate flasher module 17, which is capable of flashing lights without the use of vehicle flasher 14. Thus, module 17 can operate additional lamps such as special lights 18, 19, described above. As in the prior embodiment, the optional indicator lamp 50 may be used in this arrangement.

Alternatively, in the embodiments of either FIG. 3 or FIG. 4, module 17 can be a substitute for a factory installed module 14 or a retrofit in a vehicle that has no hazard flashers. Thus, lights 18, 19 may be factory installed lights on the vehicle, such as turn signal lights 15, 16 or still other lights.

Figure 5:
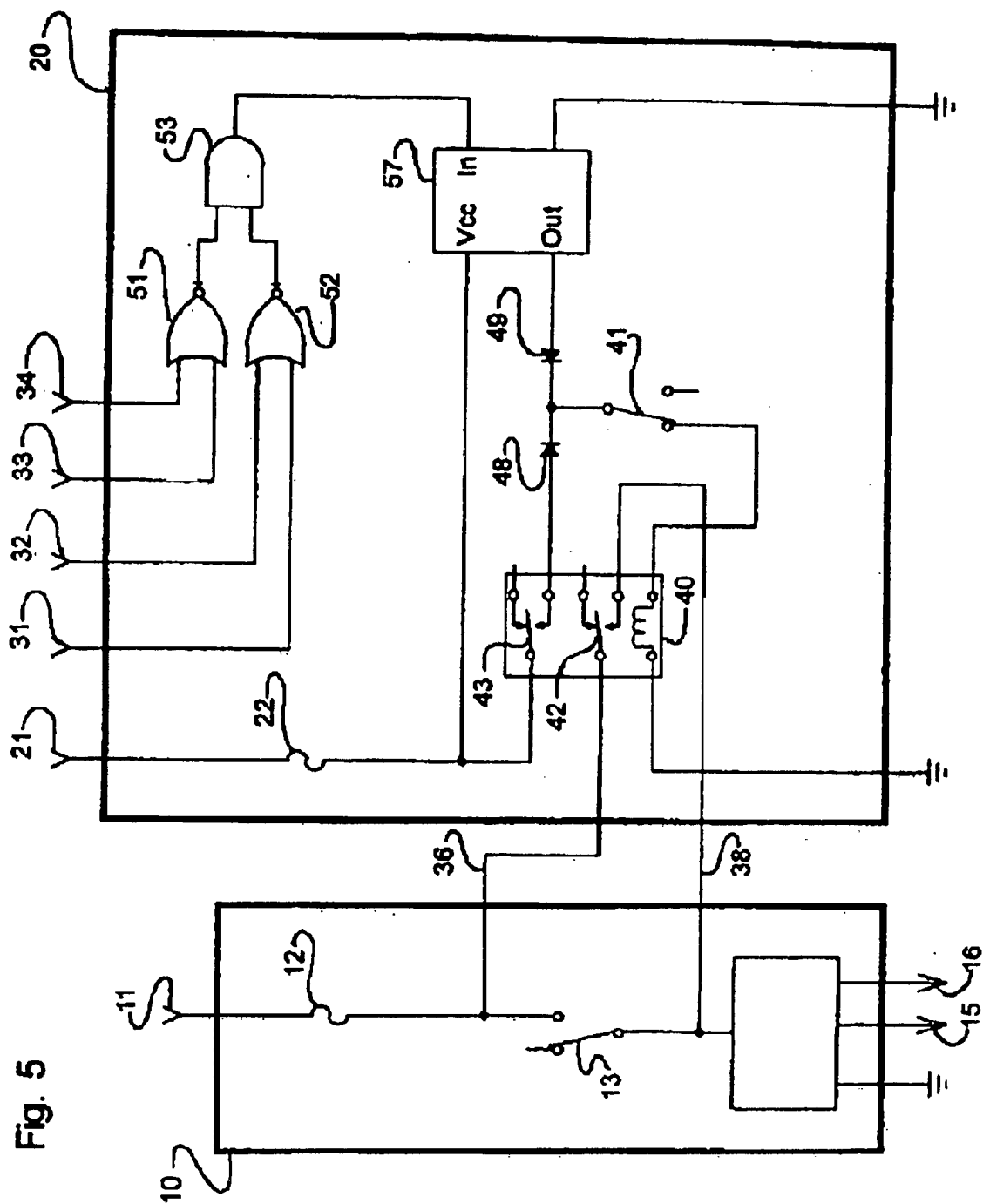
FIG. 5 is a schematic circuit diagram showing the use of logic components to implement the invention.

The embodiment of FIG. 5 provides an alternate method of powering switch 40. This method can provide power to switch 40 even if inputs 31, 32, 33, or 34 are of insufficient signal strength to power switch 40 directly. The illustrated logic circuits are offered by way of example and not limitation, as an alternative means of achieving the triggering function of FIG. 1. Logic gates 51 and 52 may be Fairchild Semiconductor CD4001BC NOR gates. Logic gate 53 may be a Fairchild Semiconductor CD4081 AND gate. Timer 57 may be a National Semiconductor LM555 timer. The illustrated interconnection of logic gates 51, 52 and logic gate 53 provides a logical output that immediately drives a trigger circuit in timer 57 whenever a signal arrives from any of the inputs 31, 32, 33, or 34. In turn, timer 57 provides current to the latching circuits 40 and 43, closing contacts at 42. This completes the circuit through leads 36 and 38, which turns on the emergency hazard lights. Until reset by switch 41, the hazard lights will continue to flash.

The general scheme of FIG. 5 can be modified to accommodate still more inputs by increasing the number of logic gates as provided at 51, 52, and 53. Isolation diodes 48 and 49 are employed as a protective circuit for timer 57, and fuse 22 protects the entire circuit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. An apparatus for automatically actuating a first hazard light in response to an electrical input signal generated within a safety system of a land vehicle having at least one safety system generating an electrical signal in response to a detected condition, wherein the first hazard light is in a first hazard light operating circuit including a current source and a manual switch, in which the manual switch is switchable between closed and open positions for respectively actuating and de-actuating the first hazard light, the apparatus comprising:

an electronic switch arranged in a by-pass circuit with respect to the manual switch, switchable between a first position opening the by-pass circuit and a second position closing the by-pass circuit, wherein the by-pass circuit is operatively connected for electrically actuating the first hazard light when the electronic switch is in second position;

a current source electrically connected to said electronic switch;

at least one input signal source from the vehicle safety system selectively sending a shared signal to both the electronic switch and to a safety device other than the hazard light system, wherein said input signal source is selected from the group consisting of a signal triggering the deployment of an air bag, a signal triggering the deployment of a seat belt tensioning retractor system, a signal indicating rapid loss of tire pressure, a signal indicating a collision, or any combination thereof; and means in said electronic switch for closing the by-pass circuit in response to receiving said input signal, whereby the first hazard light is automatically actuated in response to the input signal.

2. The apparatus of claim 1, wherein:

said electronic switch is arranged in the by-pass circuit with respect to the manual switch such that in said second position the electronic switch connects the first flash controller to a current source fed through the electronic switch.

3. The apparatus of claim 1, in which the manual switch is connected between the first hazard light and a current source such that when in an open position the manual switch has a powered side in operative connection to the current source and a non-powered side in operative connection to the first hazard light, and wherein:

said electronic switch is arranged in a by-pass circuit with respect to the manual switch such that in said second position the electronic switch connects the first hazard light to a powered side of the manual switch.

4. The apparatus of claim 1, further comprising:

a plurality of input signal sources; and means electrically isolating at least one of said plurality of input signal sources from another of the plurality of input signal sources.

5. The apparatus of claim 1, wherein said electronic switch includes an electrical latching device, latching the switch in said second position in response to receiving said input signal.

6. The apparatus of claim 5, further comprising a means for resetting said electronic switch to first position.

7. The apparatus of claim 6, wherein said means for resetting the electronic switch comprises a reset switch selectively positionable between an open state and a closed state, wherein in open state the reset switch interrupts current to said latching device.

8. The apparatus of claim 1, in which the first hazard light operating circuit includes a first flash controller, wherein:

said by-pass circuit further comprises a second flash controller;

when in said second position, said electronic switch connects said second flash controller to a current source fed through the electronic switch; and the second flash controller is in operative connection to the first hazard light for actuating the first hazard light when the electronic switch is in second position.

9. The apparatus of claim 1, in which the first hazard light operating circuit includes a first flash controller, wherein:

said by-pass circuit further comprises a second flash controller and a second hazard light;

when in said second position, said electronic switch connects said second flash controller to a current source fed through the electronic switch; and the second flash controller is in operative connection to said second hazard light for actuating the second hazard light when the electronic switch is in second position.

10. An improved apparatus for actuating a second hazard light in a land vehicle having both first and second hazard lights and at least one safety system in addition to hazard lights generating an electrical signal in response to a detected condition, the apparatus automatically actuating the second hazard light in response to an electrical input signal generated within the vehicle's safety system, wherein the first hazard light is in a first hazard light operating circuit including a manual switch, the improved apparatus comprising:

a second hazard light operating circuit containing a second hazard light and an electronic switch that is switchable between a first position opening the second hazard light operating circuit and a second position closing the second hazard light operating circuit and actuating the second hazard light;

a current source electrically connected to said electronic switch;

at least one input signal source from the vehicle safety system selectively sending a shared signal to both the electronic switch and to a safety device other than the hazard light system, wherein said input signal source is selected from the group consisting of a signal triggering the deployment of an air bag, a signal triggering the deployment of a seat belt tensioning retractor system, a signal indicating rapid loss of tire pressure, a signal indicating a collision, or any combination thereof; and means in said electronic switch for closing the second hazard light operating circuit in response to receiving said input signal, whereby the second hazard light is automatically actuated in response to the input signal.

11. The apparatus of claim 10, in which the manual switch is positioned between the first hazard light and a current source such that when the manual switch is in an open position the manual switch has a powered side in operative connection to the current source and a non-powered side in operative connection to the first hazard light, further comprising:

means operatively connecting said electronic switch to the first hazard light for electrically actuating the first hazard light when the electronic switch is in second position, whereby both the first hazard light and the second hazard light are automatically actuated in response to said input signal.

12. The apparatus of claim 10, in which the manual switch is positioned between the first hazard light and a current source such that when the manual switch is in an open position the manual switch has a powered side in operative connection to the current source and a non-powered side in operative connection to the first hazard light, further comprising:

means operatively connecting said second hazard light operating circuit to the first hazard light for electrically actuating the first hazard light when said electronic switch is in second position, whereby both the first hazard light and the second hazard light are automatically actuated in response to said input signal.

13. A method of automatically actuating a first hazard light in response to an electrical input signal generated within a safety system of a land vehicle provided with (1) at least one safety system generating an electrical input signal in response to a triggering condition, (2) a safety device other than a hazard light system and (3) a hazard light system containing a first hazard light operating circuit containing a manual switch, in which the manual switch is electrically located between the first hazard light and a current source, such that when the manual switch is in an open position it has a powered side in operative connection to the current source and a non-powered side in operative connection to the first hazard light, the method comprising:

providing a second hazard light operating circuit containing an electronic switch electrically connected to a current source and switchable between a first position opening the second hazard light operating circuit and a second position closing the second hazard light operating circuit and electrically actuating the first hazard light;

connecting the safety system to switch the electronic switch to the second position in response to receiving an input signal from the safety system;

generating an electrical input signal in response to triggering the safety system;

transmitting a shared input signal from the safety system to both the electronic switch and to said safety device other than the hazard light system; and actuating the first hazard light in response to the input signal.

14. The method of claim 13, wherein:

said input signal is selected from the group consisting of a signal triggering the deployment of an air bag, a signal triggering the deployment of a seat belt tensioning retractor system, a signal indicating rapid loss of tire pressure, a signal indicating a collision, or any combination thereof.

15. The method of claim 13, further comprising:

providing a second hazard light;

operatively connecting the second hazard light to the second hazard light operating circuit such that the second hazard light is actuated when the electronic switch is switched to second position; and thereby actuating the second hazard light in response to the input signal.

* * * * *